Figure 1:
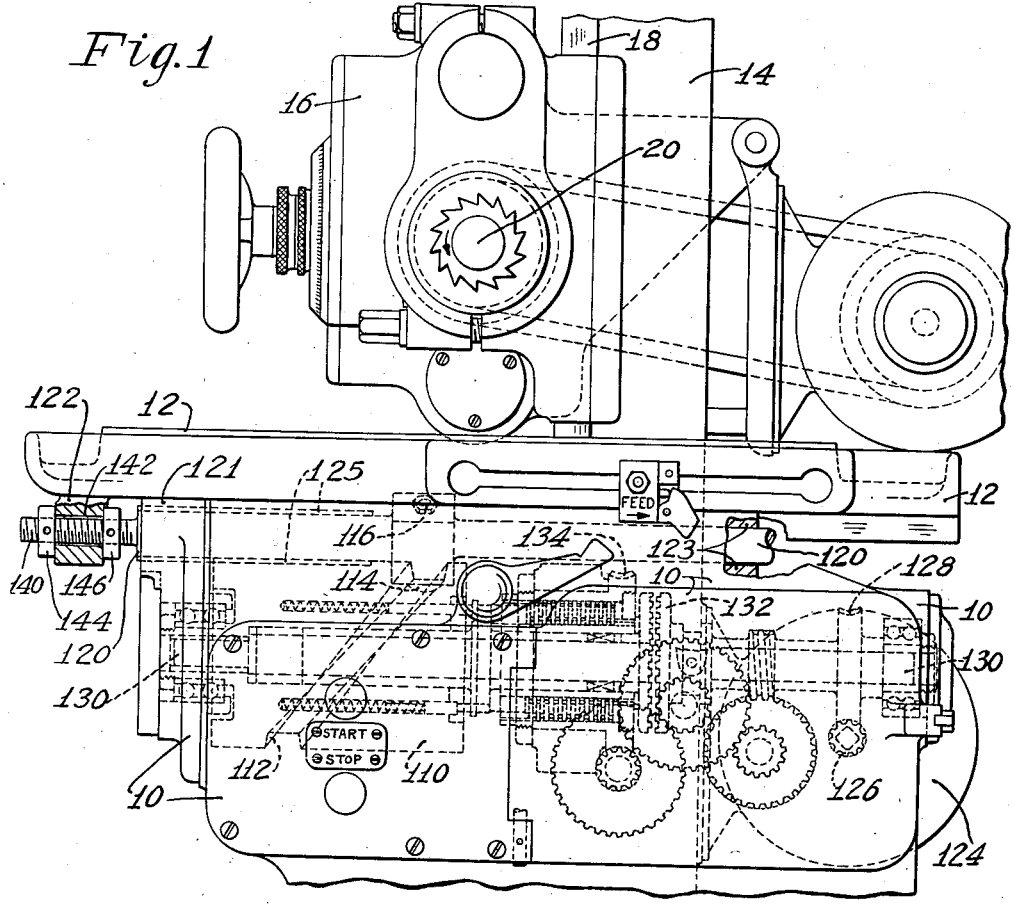

Nov. 26, 1940.  A. F. BENNETT ET AL  2,222,702

MACHINE TOOL

Original Filed Jan. 24, 1938

Witness
Charles J. Olson

Inventors
Arthur F. Bennett
George B. Hirsch
by Fred Hildreth
Cary & Jenney Attys.

Patented Nov. 26, 1940

2,222,702

UNITED STATES PATENT OFFICE 2,222,702

MACHINE TOOL

Arthur F. Bennett, West Barrington, and George B. Hirsch, Providence, R. I., assignors to Brown and Sharpe Manufacturing Company, a corporation of Rhode Island Original application January 24, 1938, Serial No. 186,500. Divided and this application June 22, 1939, Serial No. 280,510

3 Claims. (Cl. 90—21)

The present invention relates to improvements in machine tools, and is herein disclosed as embodied in a cam actuated milling machine of the manufacturing type having a rotary milling cutter, a transversely movable work supporting table, and a cam and follower drive for effecting the reciprocation of the table comprising a cylindrical driving cam, and a follower connected to the table for engagement with a cam track formed in the perpihery of the cam.

It is a principal object of the present invention to provide in a machine of the general type described having a reciprocable support and cam actuated driving connections including a rotatable cam drum with a feed and return cam track formed in the periphery thereof, and a follower engaging in the cam track, a novel construction and arrangement of these driving connections which will permit of more accurate operation of the machine and at higher speeds, and which are further constructed and arranged to absorb the heavy strains incidental to starting, stopping and driving of the table from the cylindrical cam in the most efficient manner, and without any tendency to cause rocking or lifting of the table in its ways.

It is another object of the invention to provide in a cam actuated milling machine of the general type disclosed, in which the length of table travel is fixed by the contour of the table driving cam, means under the control of the operator for effecting a rapid and accurate adjustment of the limit of travel of the table and work supported thereon with relation to the cutting tool, particularly in the direction of feed.

With these and other objects in view, as may hereinafter appear, a principal feature of the invention consists in the provision of a slide support for the cam engaging follower which is strongly supported in slide bearings on the machine base, and forms with the cam, a self-contained and self-supporting driving unit which is well adapted to absorb any twisting or radial strains which may be set up between the cam and follower, particularly under conditions of high speed operation, and to impart a smooth, accurately directed driving impulse to the table, without any tendency to cause rocking or lifting of the table in its ways.

Another feature of the invention relates specifically to the provision of a connection between the table and the follower engaging in the peripheral cam track of the cylindrical cam having means for adjustment to effect an adjustment of the position of the table longitudinally with relation to the follower whereby to effect an adjustment of the limit of travel of the table with relation to the cutting tool particularly at the limit of the feed stroke.

Figure 2:
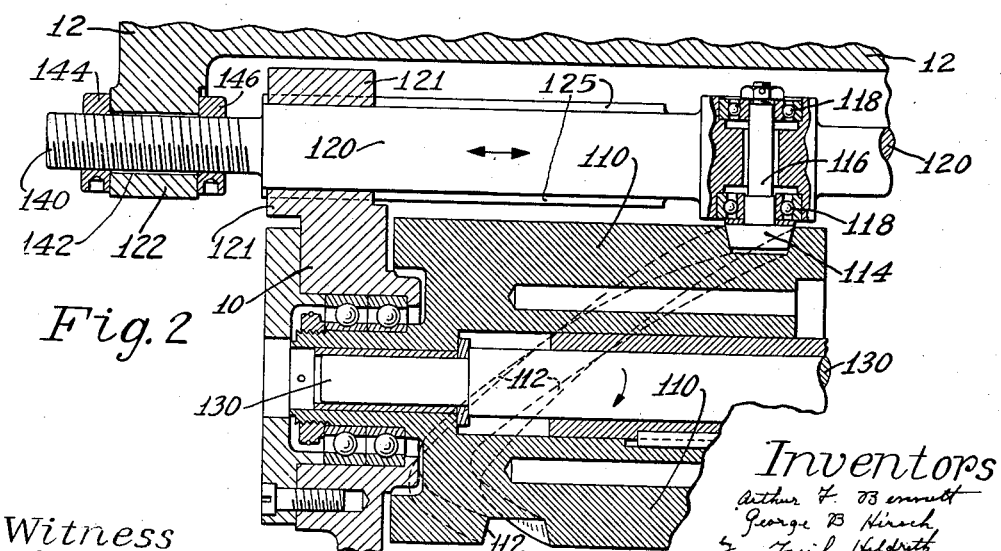

The several features of the invention consist also in the devices, combinations and arrangement of parts hereinafter described and claimed, which together with the advantages to be obtained thereby may be readily understood by one skilled in the art from the following description taken in connection with the accompanying drawing, in which Fig. 1 is a view in front elevation of a cam actuated milling machine of the manufacturing type; and Fig. 2 is an enlarged sectional view illustrating particularly the cam and follower connection including a bar support and the adjustable connection therefrom for reciprocating the work table of the machine.

The machine disclosed in the drawing as embodying in a preferred form the several features of applicants' invention, consists of the base 10 having slidably supported thereon a reciprocable work table 12, a vertically extending column 14 forming a rigid unit with the base 10, and a spindle carriage 16 supported in ways 18 on the column 14 for vertical adjustment toward and away from the table 12. The machine is also provided with a rotary milling cutter spindle 20 which is supported to turn on a horizontal axis in bearings carried on the spindle support 16. For further description of the milling cutter spindle 20 and its supporting and actuating mechanism, reference may be had to applicants' copending application Serial No. 186,500, filed January 24, 1938, of which the present application is a division.

With the construction shown in the drawing, the work supporting table 12 is driven by means of a cylindrical cam 110 rotatably supported in the machine base 10, and having formed therein a closed feed and return cam track 112 having the sides thereof sloping outwardly to receive a correspondingly tapered follower 114 which is connected for axial movement with the table. In the illustrated construction, the cam drum 110 is driven continuously in one direction to impart a reciprocatory movement to the table 12 through driving connections which include a table motor 124 mounted on the base 10. A worm 126 connected to turn with the armature shaft of the motor 124 drives a worm gear 128 secured to a table drive shaft 130 supported co-axially with the cam drum 110. The cam drum 110 may be driven from the shaft 130 alternatively at a fast or slow rate through driving connections which include a high speed driving clutch member 132 keyed to the drive shaft 130, and a slow speed driving element in the form of a worm gear 134. Inasmuch as these driving connections form specifically no part of the present invention, and are fully illustrated in the copending application of Englund, Serial No. 186,575, filed January 24, 1938, of even date with the parent application, no further description thereof is believed necessary. The above description is believed adequate to indicate the general organization of the driving connections for the table 12 which is driven by the cam drum 110 through a distance which is determined by the contour of the cam track 112, and is always the same.

In accordance with a feature of the present invention, a novel and improved construction and arrangement of the driving connections including the cam 110 and follower 114 is provided which is well adapted to provide added support for the table and to insure a smooth and accurate operation of the table in its ways unaffected by any twisting or radially acting forces which may be set up between the cam and follower during high speed operation of the machine under manufacturing conditions. In accordance with this feature of the invention, the follower 114 is formed on the lower end of a pin 116 supported in bearings 118 on a shaft or bar support 120 which extends longitudinally in the direction of table movement, and is in turn supported for sliding movement in bearings 121 and 123 on the base 10, these bearings being spaced on opposite sides of the follower 114 beyond the limits of movement thereof in each direction. The shaft 120 is supported against rotational movement by means of splines 125 formed on the shaft which engage with corresponding slots in the bearing 121. With this construction, it will readily be seen that the shaft or bar support 120, the follower 114 and the cam drum 110, all rigidly supported on the base of the machine, provide a self-contained and self-supporting unit which is specifically adapted and arranged to absorb any twisting or separating strains which may be set up in the cam and follower connection, and eliminates any tendency of these driving connections to cause objectionable vibration or strain of the table on its ways. The shaft or bar support 120 acts as a secondary support and as an actuating slide for the table, the reciprocatory movement imparted thereto being exactly that which it is desired to impart to the table 12. The bar support 120 at its left hand end is rigidly secured to a downwardly extending lug 122 on the table 12.

While it is the usual practice in machines of this type having a cam drive for the work support, to carefully adjust the position of the work on the support with reference to these known limits of table operation, in order to secure the desired operative relationship between the work and the milling cutter, it has been found that under certain conditions as, for example, where a cut is being made against a shoulder in the work, this method of setting up the work is inadequate to secure the required nicety of adjustment in the operating relationship between the cutter and the work for the performance of high grade work.

Further in accordance with the objects of the invention to provide driving connections for the tool spindle and work support susceptible of quick and accurate adjustment in accordance with the requirements of the work, the cam actuated driving connections for the work table of the illustrated machine are constructed and arranged to permit an adjustment in the position of the table 12 with relation to its driving cam 110 which is effective to secure a corresponding adjustment in the limiting position to which the work is moved with relation to the milling cutter during the movement of the table in the direction of feed, without the necessity of relocating the work on the table. To this end, mechanism is provided for adjusting the position of the table 12 with relation to the cam follower 114. The supporting shaft 120 for the follower 114 is constructed and arranged with a screw-threaded end portion 140 which passes through and is readily slidable within a bore 142 formed in the lug 122, and is held rigidly in position with relation thereto, by means of two lock nuts 144 and 146 screw-threaded to the end portion 140, and arranged for locking engagement with opposite sides of the lug 122. With this construction and arrangement of the operating connection between the follower 114 and table 12, it will be seen that an adjustment in the limit of table movement is readily obtained by backing off one or both of the lock nuts 144 and 146 to produce an axial adjustment of the shaft 120 with relation to the lug 122 and table 12.

It will be understood that the invention is not limited to the specific embodiment shown, and that various deviations may be made therefrom without departing from the spirit and scope of the appended claims.

What is claimed is:

1. In a machine tool having a base, a rotary tool spindle and a work table slidably supported for reciprocatory movement on the base, cam actuated driving connections for reciprocating the table including a cam drum rotatably supported on the base and having formed on the periphery thereof a feed and return cam track, and a cam follower engaging in said cam track, a bar support for the follower, and bearings on the base in which the bar support is slidably mounted, said bearings being located on opposite sides of the follower, and means rigidly connecting the table to move with the bar support.

2. In a machine tool having a base, a rotary tool spindle, a work table, and supporting ways on the base on which the table is slidably mounted, cam actuated driving connections for reciprocating the table including a cam drum rotatably supported on the base and having formed in the periphery thereof a feed and return cam track having the sides thereof sloping outwardly, and a cam follower correspondingly tapered for engaging in said cam track, a bar support for the follower, bearings on the base in which the bar support is slidably mounted, said bearings being located on opposite sides of the follower, and a connection between the bar support and the table rigidly connecting the table to move with the bar support.

3. In a machine tool having a base, a rotary tool spindle, a work table, and supporting ways on the base on which the table is slidably mounted, cam actuated driving connections for reciprocating the table including a cam drum rotatably supported on the base and having formed in the periphery thereof a feed and return cam track, and a cam follower engaging in said cam track, a bar support for the follower, bearings on the base in which the bar support is slidably mounted, said bearings being located on opposite sides of the follower, and a connection between the bar support and the table having means for adjustment to effect an adjustment of the position of the table longitudinally with relation to the follower, whereby to effect an adjustment of the limit of travel of the table with relation to the cutting tool particularly the limit of the feed stroke.

ARTHUR F. BENNETT.
GEORGE B. HIRSCH.